July 13, 1948.  G. R. DEMPSTER  2,445,106
AUTOMATIC HOOK
Filed Feb. 7, 1946
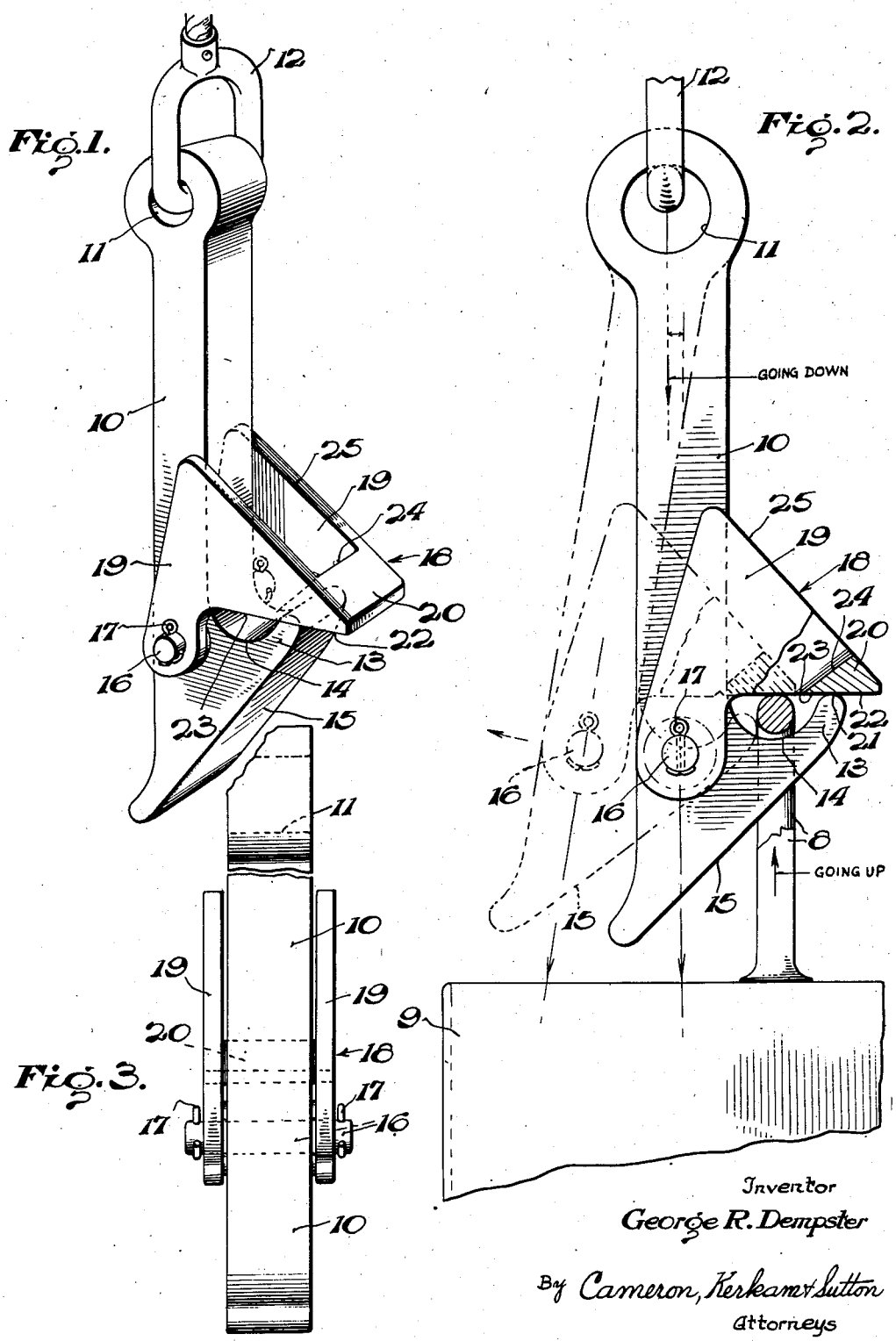
Inventor
George R. Dempster
By Cameron, Kerkam & Sutton
Attorneys Patented July 13, 1948

2,445,106

UNITED STATES PATENT OFFICE 2,445,106

AUTOMATIC HOOK

George R. Dempster, Knoxville, Tenn.

Application February 7, 1946, Serial No. 646,117

7 Claims. (Cl. 294—83)

This invention relates to automatic hooks, and more particularly to automatic hooks of the type employed in transporting and dumping equipment, but it is to be expressly understood that the present invention is not limited to use in such equipment but is of utility wherever an automatic hook is desired for engagement with and disengagement from a suitable element movable into and out of cooperation therewith as hereinafter explained.

In my Patent No. 2,121,121, granted June 21, 1938, I have disclosed and claimed an automatic hook provided with a pivotally mounted member for controlling the movement of a suitable element, such as a bail on a container, into and out of operative relationship with the dwell in the hook, but wherein said pivotally mounted member does not operate to lock the bail in said dwell. In my Patent No. 2,404,830, granted July 30, 1946, I have disclosed and claimed a control member which functions to lock the bail in the dwell, but in this construction said control member is rectilinearly movable and comprises a slotted element mounted on transverse pins for guiding its movements. It is an object of this invention to provide an improved automatic hook wherein the control member is both pivoted and operable to lock the bail or other suitable element in the dwell.

It is another object of this invention to provide an improved automatic hook of simple and rugged construction which is easily fabricated and installed, certain in action and flexible in use.

Other objects will appear as the description of the invention proceeds.

The invention is capable of receiving a variety of mechanical expressions, one of which is shown on the accompanying drawing, but it is to be expressly understood that the drawing is for purposes of illustration only, and is not to be construed as a definition of the limits of the invention, reference being had to the appended claims for that purpose.

Referring in detail to the accompanying drawing, wherein the same reference characters are used to designate corresponding parts in the several figures, Fig. 1 is a perspective view of an improved automatic hook embodying the present invention;

Fig. 2 is a side elevation, partly in section, illustrating in full and dotted lines two positions of the hook; and Fig. 3 is a rear elevation of the hook.

As shown, said automatic hook includes a body member 10, of any suitable size, construction and material, pivoted at 11 in any suitable way, here shown as carried by a suspending link 12 passed through the eye 11, although in transporting and dumping equipment, such as disclosed for example in my Patent No. 2,369,722, granted February 20, 1945, to which the present invention is applicable, the hook 10 can be pivotally mounted on a transversely extending shaft or rod passing through the eye 11.

Body member 10, near its lower extremity, is provided with an upwardly extending projection 13 between which and the body proper is formed a curved dwell 14 for cooperation with any suitable element, such as a bail 8 on a container 9 (Fig. 2). The forward face of the lower end of the hook terminating in said upwardly extending projection 13 is inclined to provide a cam surface 15 for a purpose to be explained. Extending transversely of the body member, just below and to one side of the dwell 14, is a pivot pin 16 upon which is suitably secured, as by cotter pins 17, a pivoted cam and lock member generally designated 18, said member being composed of a pair of triangularly shaped side plates 19 united at the forward lower extremity thereof by a transverse portion 20 which may be integral therewith or attached thereto in any suitable way. When in its forward lower position transverse member 20 rests on the tip 21 of the projection 13, and said members 19 are of such size that in this latter position said member 18 projects beyond said projection 13 so as to provide at its lower face a forwardly extending bottom surface 22. The under face 23 of the member 18 also constitutes a cam surface as to be explained, and the member 20 is preferably of such width in planes at right angles to pivotal axis 16 that its inner edge 24 will contact the body member 10 when said lower face 23 is in that position in which it is to function as a cam.

Assuming that a container 9 provided with a bail 8 is lifted by any suitable mechanism into engagement with the cam face 15, continued upward movement of said bail will cam said hook to the left as viewed in the drawing (see dotted line position in Fig. 2) against the action of gravity until the bail engages the overhanging surface 22 on member 18. Continued upward movement of the bail, through the coaction thereof with said overhanging surface 22, will pivot member 18 about its axis 16 until the bail has reached a position slightly above the horizontal plane of the tip 21 of projection 13, whereupon gravity will swing the hook so as to pass the projection 13 through the bail until the dwell 14 is in vertical alignment with the bail. If the elevating mechanism is now lowered the bail engages in the dwell of the hook, suspending the container from the hook, and the member 18 follows the downward movement of the bail, locking the bail in the dwell as shown in full lines in Fig. 2.

When it is desired to withdraw the bail from the hook the container is again elevated, but this time to a somewhat greater extent. During this elevation the member 18 pivots about its axis 16 until the face 24 of transverse member 20 engages the body of the hook. In this position the under face 23 of said member is upwardly inclined to the right, as viewed in the drawing, providing a cam surface up which the bail will travel, camming the hook to the left as viewed in the drawing, until the bail passes the tip of member 23, whereupon the member 18 will fall by gravity to the position shown in Figs. 1 and 2. In this position the upper face 25 of said member 18 provides a third cam surface, inclined downwardly and to the right as viewed in the drawing, so that as the container is lowered the bail will travel along this latter cam surface, again camming the hook to the left as viewed in the drawing, until the bail passes the tip of member 18, whereupon the hook may swing by gravity to the right into its free position. If desired the hook may be urged in any suitable way toward its position for engagement with the load as by weighting it as shown at 65 in my Patent No. 2,369,722, but ordinarily the weight of the parts is sufficient to obtain the desired operation without a counterweight.

Thereby the bail or other element to be engaged with the hook can be moved into and out of engagement with the dwell in the hook by simple raising and lowering movements, the hook automatically engaging and disengaging said bail or other element, and when in engagement with the hook the bail is locked in its engaged position by the automatic operation of the combined cam and lock member 18.

It will therefore be perceived that by the present invention an automatic hook has been provided which includes a member for automatically locking the bail or other element in the hook without necessitating the use of a rectilinearly movable member. At the same time the hook is simple and rugged in construction, easy to fabricate and install, certain in operation and flexible in use.

While the embodiment of the invention illustrated on the drawing has been described with considerable particularity, it is to be expressly understood that the invention is not limited thereto as the same is capable of receiving a variety of mechanical expressions as will now be apparent to those skilled in the art, while changes may be made in details of construction, arrangement, etc., without departing from the spirit of this invention. Reference is therefore to be had to the appended claims for a definition of said invention.

What is claimed is:

1. An automatic hook including a pivoted body member shaped to provide a dwell and having a cam surface operable by an element to be engaged for deflecting said body member out of the path of said element as said element moves upwardly into operative relationship with said hook, and a member pivoted to said body member adjacent to and overlying said dwell, said last named member being operable automatically by gravity to rest on and follow said element into locked position in said dwell.

2. An automatic hook including a pivoted body member shaped to provide a dwell and having a cam surface operable by an element to be engaged for deflecting said body member out of the path of said element as said element moves upwardly into operative relationship with said hook, and a member pivoted to said body member adjacent to and bridging said dwell, said bridging member being operable automatically by gravity to retain said element in locked position after engagement of said element in said dwell, said pivoted member having its lower face projecting laterally beyond said body member at said dwell for engagement with and actuation by said element to open the entrance to said dwell.

3. An automatic hook including a pivoted body member shaped to provide a dwell and having a cam surface operable by an element to be engaged for deflecting said body member out of the path of said element as said element moves upwardly into operative relationship with said hook, and a member pivoted to said body member adjacent to and overlying said dwell, said overlying member being operable automatically by gravity to retain said element in locked position after engagement of said element in said dwell and said overlying member being provided with cam surfaces for cooperation with said element to cam said overlying member and through it said body member out of alignment with said element as said element is moved upwardly with respect to said dwell and then downwardly with respect thereto.

4. An automatic hook including a pivoted body member shaped to provide a dwell and having a cam surface operable by an element to be engaged for deflecting said body member out of the path of said element as said element moves upwardly into operative relationship with said hook, and a member pivoted to said body member adjacent to and bridging said dwell, said bridging member being operable automatically by gravity to retain said element in locked position after engagement of said element in said dwell, said bridging member having its lower face projecting laterally beyond said body member at said dwell for engagement with and actuation by said element to open the entrance to said dwell and said bridging member being provided with cam surfaces for cooperation with said element to cam said bridging member and through it said body member out of alignment with said element as said element is moved upwardly with respect to said dwell and then downwardly with respect thereto.

5. An automatic hook including a pivoted body member shaped to provide a dwell, said body member having a cam surface leading to said dwell for engagement by an element to be engaged in said dwell to cam said hook out of the path of said element until said hook may swing by gravity into a position in which said dwell underlies said element, and a member pivoted to said body member adjacent said dwell in position to overlie said dwell and provided with lower and upper cam surfaces, said pivoted member being movable by gravity to lock said element in said dwell and operable by said element to cam said overlying member and through it said body member out of alignment with said element as said element is lifted from said dwell and then moved downwardly with respect thereto.

6. An automatic hook including a pivoted body member shaped to provide a dwell, said body member having a cam surface leading to said dwell for engagement by an element to be engaged in said dwell to cam said hook out of the path of said element until said hook may swing by gravity into a position in which said dwell underlies said element, and a member pivoted to said body member adjacent said dwell in a position to overlie said dwell and provided with lower and upper cam surfaces, said overlying member projecting beyond said body member to provide an under surface engageable by said element to lift said member and admit said element into alignment with said dwell and said overlying member being movable by gravity to follow said element and lock said element in said dwell, said cam surfaces on said member cooperating with said element to cam said overlying member and through it said body member out of alignment with said element as said element is lifted from said dwell and then moved downwardly with respect thereto.

7. An automatic hook including a pivoted body member shaped to provide a dwell, said body member having a cam surface leading to said dwell for engagement by an element to be engaged in said dwell to cam said hook out of the path of said element until said hook may swing by gravity into a position in which said dwell underlies said element, and a member pivoted to said body member adjacent said dwell in a position to overlie said dwell and provided with lower and upper cam surfaces, said overlying member being movable by gravity to lock said element in said dwell and said overlying member including means engageable with said body member laterally when said lower cam surface is in engagement with said element to deflect said body member and said overlying member out of the path of said element as the latter is moved upwardly from said dwell and said upper cam surface cooperating with said element to cam said body and overlying members out of the path of said element as said element is moved downwardly with respect thereto after disengagement from said lower cam surface.

GEORGE R. DEMPSTER.

REFERENCES CITED

The following references are of record in the file of this patent:

UNITED STATES PATENTS

| Number | Name | Date |
| --- | --- | --- |
| 1,150,581 | De Lau | Aug. 17, 1915 |
| 1,367,044 | Hausler | Feb. 1, 1921 |